United States Patent [19]
Bedard et al.

[11] 3,914,363
[45] Oct. 21, 1975

[54] METHOD OF FORMING SELF-LIMITING CONDUCTIVE EXTRUDATES

[75] Inventors: Ronald L. Bedard, San Leandro; Robert Smith-Johannsen, Portola Valley; Wendell W. Moyer, Jr., Atherton, all of Calif.

[73] Assignee: Raychem Corporation, Menlo Park, Calif.

[22] Filed: Jan. 17, 1974

[21] Appl. No.: 434,277

Related U.S. Application Data

[63] Continuation-in-part of Ser. No. 287,442, Sept. 8, 1972, abandoned.

[52] U.S. Cl............. 264/105; 29/611; 174/120 SC; 264/174; 264/235; 338/214
[51] Int. Cl.² ................. B29C 25/00; B29F 3/10
[58] Field of Search ......... 264/105, 174, 235, 346; 338/214; 174/120 SC, 102 SC, 174/105 SC, 106 SC

[56] References Cited
UNITED STATES PATENTS

| | | | |
|---|---|---|---|
| 2,905,919 | 9/1959 | Korch et al. | 338/214 |
| 3,100,136 | 8/1963 | D'Ascoli et al. | 264/174 |
| 3,793,716 | 2/1974 | Smith-Johannsen | 264/105 |

*Primary Examiner*—Donald J. Arnold
*Assistant Examiner*—Gene Auville
*Attorney, Agent, or Firm*—Lyon & Lyon

[57] ABSTRACT

Described herein are methods and articles obtained according to methods for insulatively jacketing thermoplastic extrudates of crystalline polymeric composition containing not more than about 15% by weight conductive carbon black, all without diminishing the low resistivity the extrudates otherwise enjoy following annealing at temperatures at or above the crystalline melting point of said polymeric material and greater than about 250°F for prolonged periods, generally in excess of about 15 hours. The jacketing material is a thermoplastic incompatible with said crystalline polymeric material, shape-retaining at the temperature of annealing, and which when combined with the initial extrudate and brought from room temperature to annealing temperature exhibits an appreciable degree of residual stress, an apparently critical property. Preferred jacketing materials include polyester- and polyether-based polyurethanes and copolymers of hexafluoropropene and vinylidene fluoride.

10 Claims, No Drawings

METHOD OF FORMING SELF-LIMITING CONDUCTIVE EXTRUDATES

CROSS REFERENCE TO RELATED APPLICATION

This is a continuation in part of our application Ser. No. 287,442 filed Sept. 8, 1972, now abandoned.

BACKGROUND OF THE INVENTION

Electrically conductive thermoplastic compositions have previously been achieved by the addition of conductive carbon black to a polymeric base. In one category of such compositions, advantage has been taken of a non-linear positive temperature resistivity coefficient displayed by the particular material to obtain self-regulating or current-limiting semiconductive articles. In U.S. Pat. No. 3,243,753 to Kohler, one such composition is described as containing from 25 to 75% carbon black about which the polymeric matrix has been formed by in situ polymerization. As the temperature of such a composition increases, either through a rise in ambient temperature or by reason of resistive heating occasioned by the passage of current therethrough, the polymer matrix expands at a rate greater than that of the carbon black particles which, in an interconnected array of channels, impart the property of conductivity. The resulting diminution in the number of current-carrying channels decreases the amount of power generated by $I^2R$ heating. This self-limiting feature may be put to work in, eg, heat tracing pipes in chemical plants for freeze protection, maintaining flow characteristics of viscous syrups, etc. In such applications, articles formed from the conduction composition ideally attain and maintain a temperature at which energy lost through heat transfer to the surroundings equals that gained from the current. If the ambient temperature then falls, increased heat transfer to the surroundings is met by increased power generation owing to the resistivity decrease associated with the article's lowered temperature. In short order, parity of heat transfer and power generation is again attained. Conversely, where ambient temperature increases heat transfer from the conductive article is reduced and the resistivity rise resulting from increased temperature diminishes or stops $I^2R$ heating.

Self-regulating conductive compositions may, of course, be used in employments other than resistive heating, for example, in heat sensing and circuit-breaking applications. In every case, however, the high carbon black content characteristic of most prior art compositions is disadvantageous. High black loadings are associated with inferior elongation and stress crack resistance, as well as low temperature brittleness. In addition, high black loading appears to adversely affect the current-regulating properties of the conductive compositions. If a semi-conductive thermoplastic composition is externally heated and its resistivity plotted against temperature (on the abscissa) the resulting curve will show resistivity rising with temperature from the low room temperature value ($R_i$) to a point of "peak resistance" ($R_p$), following which additional increase in temperature occasions a precipitous resistivity drop associated with the melt phase of the polymer matrix. To avoid resistance runaway with the concomitant irreversible change in resistivity characteristics, the practice of cross-linking the polymer matrix has grown up, in which event resistivity levels off at the peak temperature and remains constant upon further increse in ambient temperatures. Cross-linked semi-conductive articles with high black loadings exhibit undesirably low resistivity when brought to peak temperature by exposure to very high or low ambient temperatures. In such instances poor heat transfer characteristics can prevent dissipation of $I^2R_p$ generation, causing burnout.

It would accordingly be desirable to prepare semi-conductive self regulating articles with substantially lower black contents, with the objects, inter alia, of improving flexural and other physical properties and substantially increasing the ratio $R_p/R_i$. However, attainment of these goals has in large part been precluded by the extremely high room temperature resistivities exhibited by polymers with low black loadings. In Cabot Corporation's Pigment Black Technical Report S-8, entitled "Carbon Blacks for Conductive Plastics" percent carbon-resistivity curves for various polymers containing "Vulcan XC-72", an oil furnace black, show resistivities of 100,000 ohm-cm or more, asymptotically increasing at black loadings of about 15%. Others have reported similarly high resistivities with low black loads. Recently resistivities sufficiently low for freeze protection applications have been achieved with low black loadings by resort to the special deposition techniques, such as solvent coating, disclosed in commonly assigned copending U.S. Pat. application Ser. No. 88,841, filed Nov. 12, 1970 by Robert Smith-Johannsen now abandoned. Self-limiting compositions have been extruded heretofore, eg, U.S. Pat. No. 3,435,401 to Epstein, but when low black loading has been attempted to the extrudates have exhibited room temperature resistivities of $10^7$ ohm-cm or higher, essentially those of the polymer matrices themselves. Indeed, the patentees in G.B. Pat. No. 1,201,166 urge the avoidance of hot melt techniques where significant conductivities are desired with less than about 20% black. Recently, however, it has been found that extruded thermoplastics containing not more than about 15% by weight conductive carbon black may be reduced in resistivity to acceptable levels by holding the extrudate at temperatures greater than about 250°F, preferably at least about 300°F and above the crystalline melting point of the polymeric matrix for prolonged periods, frequently in excess of 15 hours. These techniques are disclosed in commonly assigned application Ser. No. 287,444 entitled "SELF-LIMITING CONDUCTIVE EXTRUDATES AND METHODS THEREFOR" filed Sept. 8, 1972 now U.S. Pat. No. 3,861,029, the disclosure of which is incorporated herein by reference to illuminate the background of the present invention. The thermostructuring of contained carbon which is the object of such prolonged annealing cannot be had where the polymeric matrix is first cross-linked. On the other hand, exposure to temperatures in excess of the crystalline melting point of the matrix causes the extrudate to flow. Depending upon the degree of configurational change, the results of such flow range from greatly variant wattage over the length of the annealed extrudate to actual destruction thereof. We attempted to retain the configuration of the extrudate first obtained by extruding thereover a surrounding insulative layer of a material which is shaped-retaining at the annealing temperature, ie, one which does not attain a softening or crystalline melting point or range during annealing. However, on frequent occasion, the material chosen for jacketing had the effect of increasing resistivity of the annealed extrudate far beyond useful ranges. The need for criteria by which suitable jacketing candidates could be selected remained.

BRIEF SUMMARY OF THE INVENTION

We have now found a category of materials useful for jacketing carbon-black containing crystalline thermoplastics to the end of retaining shapes into which they have been extruded during prolonged annealing at elevated temperature, all without unduly disturbing the resistivity characteristics of the annealed articles. In brief, suitable jacketing materials appear to be those which, in addition to their shape-retentive characteristics at annealing temperature, exhibit an appreciable degree of residual stress when combined with the initial extrudate and brought from room temperature to annealing temperature.

DETAILED DESCRIPTION OF THE INVENTION

Residual stress is a property exhibited by many material combinations during or after temperature changes. An example of one such combination is the bimetallic strip, in which a change of curvature occurs upon temperature change. The increased forces in the strip which force distortion of shape are due to the difference in thermal expansion of the two metals comprising the strip. Were the distortion to be prevented, the strip would exert considerable residual stress. Were the more expansive material totally contained within the less expansive material, upon heating the outer material would exist in a state of residual tensile stress and the inner material would be subject to a compressive stress. This compressive force is, we believe, the same as that to which black-containing extrudates jacketed according to the invention are subject during annealing.

The existence or not of a residual stress characteristic at the annealing temperature can be quantitatively determined on apparatus such as a thermal-mechanical analyzer (TMA). Thus, an extruded piece of a jacketing candidate may be placed in the grips of the TMA and a nominal load applied. Thereafter, the material is brought from room temperature to annealing temperature and the length change recorded. If the length change is less than one third of the volume change of the core material in the same temperature range, then the jacketing material will be seen to be suitable from that standpoint in the practice of this invention. Materials which soften or melt or undergo more expansion than the core material at or below the annealing temperature will, on the other hand, undergo marked relaxation before that temperature is attained and will accordingly at annealing temperature register no residual stress relative to the core material. In the case of materials which are thermally cured in the course of heating to annealing temperature, some initial relaxation may be experienced prior to inception of cure, but in the case of suitable materials such as the thermally curable siliconerubbers employed in one embodiment of the invention that relaxation appears to be recovered and the residual stress characteristic to come into play in useful degree at annealing temperatures. Especially preferred jacketing materials are polyester-based polyurethanes like those sold by the Mobay Chemical Company under the name Texin 591-A, a polymer characterized by the absence of reactive end-groups, blocking temperature of 305°F, Shore A hardness of 91 ± 3, ultimate tensile strength greater than 6,500 psi and ultimate elongation greater than about 500%. Another generally suitable polymer is the polyester-based thermoplastic polyurethane available from B. F. Goodrich Company under the name Estane 58305, blocking temperature about 300°F. In the case of black-containing extrudates whose polymer matrices exhibit crystalline melting temperatures significantly greater than the polyethylene compositions with which the jacketings materials last-mentioned are preferably employed, we have found vinylidene fluoride-hexafluoropropene copolymers like the "Viton" copolymers sold by the DuPont Company to be eminently suitable. Other materials suitable to the practice of the invention will occur in the art-skilled in light of the foregoing and the additional criteria discussed infra.

In order to obtain self-limiting compositions, the polymeric matrix in which conductive black is dispersed in whatever proportion must exhibit overall an appropriately non-linear coefficient of thermal expansion, for which reason a degree of crystallinity is believed essential. Generally, polymers exhibiting at least about 20% crystallinity as determined by x-ray diffraction are suited to the practice of the invention. Among the many polymers which may serve as the black-containing matrix are polyolefins such as low, medium and high denisty polyethylenes and polypropylene, polybutene-1, poly(dodecamethylene pyromellitimide), ethylenepropylene copolymers and terpolymers with non-conjugated dienes, polyvinylidene fluoride-tetrafluoroethylene copolymers, etc. As will be recognized by those skilled in the art, limiting temperatures tailored to the application intended (eg, freeze protection, thermostatting, etc.) may be obtained by appropriate selection of polymeric matrix material. For example, elements which self-limit at temperatures on the order of 100°F, 130°F, 150°F, 180°F and 250°F may be produced with, respectively, wax-poly(ethylenevinyl acetate) blends, low density polyethylene, high density polyethylene, polypropylene and polyvinylidene fluoride. Other criteria of polymer selection will, in particular instances, include desired elongation, environmental resistance, ease of extrusibility, etc. as is well known.

Particularly preferred matrix materials are multicomponent blends in which black is mixed with a first blend component to form a master batch which is in turn mixed with the principal polymeric component. The first and second polymer blend component are chosen such that they exhibit a positive free energy of mixing, one with the other. Their attendant incompatibility apparently has the effect of segregating contained black into generally delimited regions of the polymer matrix, and such blends have proven extremely stable in the face of temperature cycling in use. Typically, the minor polymeric blend component is chosen for superior compatibity with carbon black relative to the blend component present in major proportion, while the latter component is selected for the particular physical properties desired in the overall extrudate. The principal blend component is preferably present in at least about 3:1 weight ratio relative to the minor component with which the black is first mixed. Presently, the blends most preferred have a polyethylene as the principal component, the other being an ethylene-vinyl ester copolymer, such as ethylene-vinyl acetate or ethylene-ethylacrylate copolymers. An especially preferred extrudate core contains about 70:20 polyethylene: ethylene-ethyl acetate copolymer by weight. It is believed essential that the jacketing material be incompatible (ie, immiscible) with the polymerix matrix material in the core extrudate. In every case where a material identical to the core matrix or a predominant polymeric component thereof has employed as an extruded jacket, resistivity of the annealed article has been unsatisfactorily high. Of course, any additional jackets optionally applied over that most adjacent the black-containing matrix may be chosen without reference to compatibility with other component of the article.

The carbon blacks employed are those conventionally used in conductive plastics, eg, high structure varieties such as furnace and channels blacks. Other conventional addends such as antioxidants, etc., may be blended with the polymeric matrix provided only that their quantities and characteristics do not subvert the objects of the invention. An especially interesting case of beneficial addends it has been found, are materials such as waxes which, while compatible with the predominant blend component melt at lower temperature. The result is to permit obtainment of a given wattage at lower temperature, owing to a first peaking effect of the wax on the resistivity-temperature curve. Compounding is conventional and generally involves banburying, milling and pelletizing prior to pressure extrusion of the self-limiting element from the melt.

In the preferred embodiment, the black-containing matrix is extruded onto a spaced-apart pair of elongate electrodes to form an element rod-shaped or, most preferably, dumbell-shaped in cross-section, the extruded thermoplastic both encapsulating and interconnecting the electrodes.

Extrusion of the insulative jacket may be conducted by the tubing method known to the industry, ie, by extruding a tubular segment over the electrode-supplied core which, within a few inches of the extruder head and while yet in the melt, is drawn down on the core by imposition of a vacuum. Alternatively, the jacket may be applied to the core extrudate by extrusion directly thereon, employing a suitable die. However, particularly in the case where the intended article is irregular in cross-section, (eg, dumbell-shaped) the tubing method is preferably employed.

Annealing is performed at a temperature greater than about 250°F, preferably at least about 300°F, and in any case at or above the melting point or range of the polymeric matrix in which the carbon black is dispersed. The period over which annealing is effected will, it will be appreciated, vary with the nature of the particular matrix and the amount of carbon black contained therein. In any case, annealing occurs over a time sufficient to reduce resistivity (R) of the annealed element containing (L)% carbon black to satisfaction of the equation $2L + 5 \log_{10} R \leq 45$, preferably $\leq 40$, and the time necessary in a particular case may be readily determined empirically. Typically, annealing is conducted over a period in excess of 15 hours, and commonly at least about a 24 hour anneal is had. Where the element is held at anneal temperature continuously throughout the requisite period, it is advisable to control cooling upon completion of the anneal so that at least about 1½ hours are required to regain room tmeperature. However, it has been learned that control of cooling is substantially less important where the requisite overall annealing residence time is divided into at least about three roughly equal stages, and the element returned to room temperature between each annealing stage.

Upon completion of annealing and optional addition of a further insulative jacket of, eg, polyethylene, the self-limiting element is desirably subjected to ionizing radiation sufficient in strength to cross-link the black-containing core. Radiation dosage is selected with an eye to achieving cross-linking sufficient to impart a degree of thermal stability requisite to the particularly intended application without unduly diminishing crystallinity of the polymer matrix, ie., overall crystallinity of the cross-linked black-containing matrix less than about 20% is to be avoided. Within those guidelines, radiation dosage may in particular cases range from about 2 to 15 megarads or more, and preferably is about 12 megarads.

The invention is further described in the following Examples of preferred embodiments thereof, in which all parts and percentages are by weight, all resistivities measured at room temperature and with a Wheatstone bridge unless otherwise indicated.

EXAMPLE 1

Seventy-six parts of polyethylene (density 0.929 gm/cc), 32 parts of a mixture of 34% Vulcan XC-72 and ethylene ethyl acrylate copolymer (density 0.930 gm/cc, 18% ethyl acrylate) were loaded with 1 part of antioxidant into a Banbury mixer. The ram was closed and mixing commenced. When temperature reached about 240–50°F the batch was dumped, placed in a 2-roll mill, and cut off in strips which were fed to a pelletizing extruder. The pelletized compound was next extruded onto two parallel tinned copper electrodes (20 AWG 19/32) to form an extrudate generally dumbbell-shaped in cross-section. The electrodes were 0.275 inch apart (center-to-center), the interconnecting web being about 15 mils in thickness, at least 8 mils thickness of the semiconductive composition surrounding the electrodes. Extrusion was performed in a plasticating extruder with crosshead attachment (Davis-Standard 2 inch extruder, 24/1 L/D, with PE screw. Thereafter, the same extruder was arranged to extrude an 8 mil thick insulation jacket of polyurethane (Texin 591-A, available from the Mobay Corporation). For optional geometric conformation, a conventional tube extrusion method was employed in which a cacuum (eg 5–20 in. H$_2$O) is drawn in the molten tube to collapse it about the semi-conductive core within about 3 inches of the extrusion head. The jacketed product was next spooled onto aluminum disks (26 inch dia) and exposed to 300°F for 24 hours in a cirulating air oven. Following this thermal structuring procedure and cooling to room temperature oven about 1½ hours the resistivity of the sample was determined at various temperatures. The following data was taken.

TABLE 1

| Resistivity Variance with Temperature | |
|---|---|
| T,°F | R,ohm-cm |
| 60 | 22,730 |
| 80 | 26,400 |
| 100 | 40,500 |
| 120 | 99,900 |
| 140 | 399,600 |
| 160 | 2,640,000 |
| 180 | 30,600,000 |
| 200 | > 10$^7$ |

EXAMPLES 2–9

Additional extrudates were prepared with various polymers and black loadings following the procedure of Example 1 save where otherwise indicated below. The polymeric matrices for the various examples were as follows: (2) a 3:1 blend of low density polyethylene: ethylene ethyl acrylate copolymer; (3) a 5:1 blend of low density polyethylene: ethylene vinyl acetate copolymer; (4) polyvinylidene fluoride; (5) a 3:1 blend of medium density polyethylene: ethylene-ethyl acrylate copolymer (6) a 3:1 blend of high density polyethylene: ethylene-ethyl acrylate copolymer: (7) ethylene/propylene copolymer (Eastman Chemical Company's "Polyallomer"); (8) polybutene-1; and (9) polyvinylidene fluoride/tetraflurorethylene copolymer (Pennwalt Chemical Company's "Kynar 5200"). In the case of each blend, carbon black was first mixed with the minor component of the polymeric blend, and the resulting masterbatch mixed with the other polymeric omponent. The jacketed extrudate of each composition exhibited a non-linear positive resistivity temperature coefficient. The data reported in Table II was taken.

TABLE IV

| Example | Jacket Material | Exposure Time at 300°F (hrs.) | Room Temperature Resistivity following annealing (ohm-cm) |
|---|---|---|---|
| — | None (Control) | 24 | 3,185 |
| 11 | Polyvinylidene fluoride high m.w. ("Kureha 1000") | 30 | 4,990 |
| 12 | Polyether-based polyurethane ("Texin 591-A") | 24 | 3,185 |
| 13 | Polyvinylidene fluoride, low m.w. ("Kureha 850") | 30 | 72,000 |
| 14 | Silicone Rubber (General Electric Co.) | 20 | 5,260 |
| 15 | Silastic S-2288 | 24 | 5,550 |

For comparison' sake, otherwise identical extrudates were jacketed with two nylons known not to display residual stress at 300°F, ie, polyaurylactam and poly-11-amino-undecanoic acid, respectively available from Aquitane-Organico Company as Nylon 12 and Nylon 11. Following annealing, room temperature resistivities were respectively 278,000 and 2,220,000 ohm-cm.

Table II

| Example | % Carbon | R(as extruded) ohm-cm | R(annealed) ohm-cm | Rp ohm-cm | Annealing Regimen | 2 L + 5 log R |
|---|---|---|---|---|---|---|
| 2 | 10 | $10^9$ | $5 \times 10^3$ | $10^7$ at 210°F | 24 hrs. 300°F | 38.5 |
| 3 | 10 | $10^9$ | 6050 | $2 \times 10^5$ at 212°F | 18 hrs. 350°F | 38.9 |
| 4 | 13 | $10^{12}$ | 116 | $6 \times 10^3$ at 325°F | 2 hrs. 450°F | 36.5 |
| 5 | 13 | $10^{11}$ | 393 | $2.82 \times 10^6$ at 240°F | 15 hrs. 300°F | 39.0 |
| 6 | 6 | $10^{11}$ | 670 | $2.66 \times 10^6$ at 280°F | 20 hrs. 300°F | 23.0 |
| 7 | 9 | $10^{12}$ | 5980 | $5.78 \times 10^6$ at 220°F | 20 hrs. 400°F | 36.9 |
| 8 | 13 | $10^{10}$ | 434 | $1.59 \times 10^5$ at 210°F | 5 hrs. 300°F | 39.2 |
| 9 | 13 | $10^{11}$ | 39.9 | 800 at 250°F | 4 hrs. 450°F | 34.0 |

EXAMPLE 10

The procedure of Example 1 was repeated to obtain an identical polyurethane - jacketed extrudate. Thereafter, the extrudate was exposed to 300°F for nine 3-hour periods. Separated by intervals in which the article was permitted to cool to room temperature. Thereafter, the annealed article was provided with a final insulative jacket of polyethylene (12 mils in thickness) by the tubing extrusion method and cross-linked throughout by exposure to a 1-Mev electron beam for a total dose of 12 megarads. The strip so produced exhibited the following resistivity values at the temperatures given in Tablee III.

TABLE III

| T°F | R ohm-cm | T°F | R ohm-cm |
|---|---|---|---|
| 60 | 4800 | 140 | 69,900 |
| 80 | 5910 | 160 | 481,500 |
| 100 | 9600 | 180 | 6,150,000 |
| 120 | 20,950 | 200 | $> 2 \times 10^7$ |

EXAMPLES 11–15

Essentially following the procedure of Example 1 save where otherwise indicated, additional jacketing candidate materials were applied and tested. The data set out in Table IV was taken.

EXAMPLE 16

Into a Banbury mixer were placed 3780 grams of polyvinylidene fluoride and 306 grams of a conductive furnace black. The batch was mixed 7 minutes and dumped when the temperature reached 340°F. The material was milled, chopped, pelletizied and extruded and jacketed as in Example 1, employing DuPont's "Viton", a copolymer of hexafluoropropene and vinylidene fluoride. The sample was then annealed for 2 hours at 400°F, whereafter its room temperature resistivity was determined to be 1,050 ohm-cm. It is noteworthy that a control extrudate having no jacket exhibited room temperature resistivity following annealing of 3,740,000 ohm-cm, underlining the importance of the residual stress characteristic of the jacket material in the case of especially low black loadings.

We claim:

1. In the method of forming a self-regulating conductive article in which a composition comprising a crystalline thermoplastic polymeric material and not more than about 15% carbon based on the total weight of said composition is extruded onto a pair of elongate parallel electrodes held in spaced-apart relation to form an electrode interconnecting web and in which the extrudate is thereafter annealed at a temperature at or above the crystalline melting point of said polymeric material and greater than 250°F for a time sufficient to reduce the room temperature resistivity thereof to within the range from about 5 to about 100,000 ohm-cm, the improvement wherein prior to annealing an electrically insulative surrounding layer is extruded onto said extrudate, said layer consisting essentially of a thermoplastic material incompatible with said polymeric material, shape-retaining at the temperature of annealing, and which when combined with the initial extrudate and brought from room temperature to annealing temperature is subjected to an appreciable degree of residual stress.

2. The method of claim 1 wherein said annealing temperature is at least about 300°F.

3. The method of claim 1 wherein said insulative layer consists essentially of a polyether-based polyurethane.

4. The method of claim 1 wherein said insulative layer consists essentially of a copolymer of hexafluoropropene and vinylidene fluoride.

5. The method of claim 1 wherein said insulative layer consists essentially of a silicone rubber composition thermally curable at a temperature equal to or less than the said annealing temperature.

6. The method of forming a self-regulating conductive article which comprises the steps of (1) extruding onto a pair of elongate parallel electrodes held in spaced-apart relation on electrode-interconnecting web of a composition consisting essentially of (a) a crystalline thermoplastic polymeric material and (b) conductive carbon black, the percentage by weight of carbon black based on the total weight of said composition being not greater than about 10; (2) extruding onto the extrudate produced in step (1) an electrically insulative surrounding layer; and (3) annealing the resulting article at a temperature at or above the crystalline melting point of said polymeric material and at least about 300°F for a time sufficient to reduce the room temperature resistivity thereof to within the range from about 5 to about 100,000 ohm-cm; the said insulative layer consisting essentially of a thermoplastic material incompatible with said polymeric material, shape-retaining at the temperature of annealing, and which when combined with the initial extrudate and brought from room temperature to annealing temperature is subjected to an appreciable degree of residual stress.

7. A method according to claim 6 wherein said insulative layer consists essentially of a polyether-based polyurethane.

8. A method according to claim 6 wherein said insulative layer consists essentially of a copolymer of hexafluoropropene and vinylidene fluoride.

9. A method according to claim 7 wherein said polymeric material consists essentially of a blend of polyethylene and, in minor proportion relative thereto, a copolymer of ethylene and vinylester.

10. The method of claim 1 wherein said polymeric material consists essentially of a material selected from the group consisting of (a) a blend of polyethylene and, in minor proportion relative thereto, a copolymer of ethylene and a vinyl ester, (b) polyvinylidene fluoride, (c) polybutene-1, and (d) ethylene-propylene copolymer; and wherin said insulative layer consists essentially of a material selected from the group consisting of (a) a copolymer of hexafluoropropene and vinylidene fluoride and, where said polymeric material is other than polyvinylidene fluoride, (b) a polyether-based polyurethane.

* * * * *